United States Patent
Li et al.

(10) Patent No.: US 10,482,659 B2
(45) Date of Patent: Nov. 19, 2019

(54) SYSTEM AND METHOD FOR SUPERIMPOSING SPATIALLY CORRELATED DATA OVER LIVE REAL-WORLD IMAGES

(71) Applicant: ORACLE INTERNATIONAL CORPORATION, Redwood Shores, CA (US)

(72) Inventors: Xin Li, Sunnyvale, CA (US); John R. Punin, Mountain View, CA (US); Rashmi Raja, Mountain View, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 160 days.

(21) Appl. No.: 14/799,859

(22) Filed: Jul. 15, 2015

(65) Prior Publication Data
US 2017/0018120 A1    Jan. 19, 2017

(51) Int. Cl.
*G06T 19/00* (2011.01)

(52) U.S. Cl.
CPC ................. *G06T 19/006* (2013.01)

(58) Field of Classification Search
CPC .... G06F 17/30241; G06F 3/012; G06F 3/017; G06Q 10/00; H04N 7/181; H04W 4/02; G09G 2340/10; G09G 2340/14; G09G 2380/02; G06T 15/00; G06T 19/006; H04M 1/6058
USPC ........................................................ 345/421
See application file for complete search history.

(56) References Cited

U.S. PATENT DOCUMENTS

| | | | |
|---|---|---|---|
| 8,761,811 B2 | 6/2014 | Alonzo | |
| 2011/0151970 A1* | 6/2011 | Osman | A63F 13/40 463/30 |
| 2013/0132375 A1* | 5/2013 | Jones | G06F 3/04815 707/722 |
| 2014/0122040 A1 | 5/2014 | Marti | |

(Continued)

OTHER PUBLICATIONS

Metaio SDK Documentation; downloaded May 26, 2015 from: http://dev.metaio.com/sdk/documentation/ pp. 1-3.

(Continued)

*Primary Examiner* — Kimbinh T Nguyen
(74) *Attorney, Agent, or Firm* — Kraguljac Law Group, LLC

(57) ABSTRACT

Systems, methods, and other embodiments are disclosed that augment a visually displayed portion of a facility with superimposed virtual elements. In one embodiment, mobile position data is generated based on non-optical sensor readings taken by a mobile computing device. The mobile position data represents a location and an orientation of the mobile computing device in a three-dimensional (3D) space of the facility. Projection parameters are generated based on the mobile position data and are applied to modeled facility data to generate rendered image data. The modeled facility data represents hidden and unhidden elements of the facility within the 3D space. The rendered image data is superimposed on live real-time image data acquired by the mobile computing device and displayed by the mobile computing device. The projection parameters promote spatial alignment of the rendered image data with the live image data with respect to positions within the 3D space.

20 Claims, 16 Drawing Sheets

(56) References Cited

U.S. PATENT DOCUMENTS

| | | | |
|---|---|---|---|
| 2014/0171114 A1 | 6/2014 | Marti et al. | |
| 2014/0210856 A1* | 7/2014 | Finn | G01C 15/002 |
| | | | 345/633 |
| 2014/0247279 A1 | 9/2014 | Nicholas et al. | |
| 2014/0247280 A1 | 9/2014 | Nicholas et al. | |
| 2015/0317070 A1* | 11/2015 | Lammers Van Toorenburg | G06F 3/04842 |
| | | | 715/771 |

OTHER PUBLICATIONS

Dieter Bohn et al.; Up close with the HoloLens, Microsoft's most intriguing product in years (Welcome to the age of holographs); The Verge; downloaded Jul. 10, 2015 from: http://www.theverge.com/2015/1/21/7868251/microsoft-hololens-hologram-hands-on-experience; pp. 1-9.

Mark Hachman; Hands-on with Microsoft's HoloLens: The 3D augmented reality future is now; PCWorld; Jan. 22, 2015; downloaded from: http://www.pcworld.com/article/2873657/hands-on-with-microsofts-hololens-the-3d-augmented-reality-future-is-now.html; pp. 1-5.

Sean P. Aune; Metaio Hands-Free Car Manual Concept Comes to Google Glass; Sep. 18, 2013; downloaded from: http://www.technobuffalo.com/2013/09/18/metaio-hands-free-car-manual-concept-comes-to-google-glass/; pp. 1-3.

\* cited by examiner

SYSTEM AND METHOD FOR SUPERIMPOSING SPATIALLY CORRELATED DATA OVER LIVE REAL-WORLD IMAGES

BACKGROUND

To perform work in a facility such as maintenance or modification, a worker needs to understand the current and/or future configuration of relevant systems within the facility. Certain systems in a facility such as air ducts, electrical wiring, and water pipes can be obscured from the naked eye by default. For example, such systems can reside within walls, ceilings, and floors of a facility. This creates difficulties for the worker with respect to learning about these system configurations on-site.

A traditional approach is to have a technician with technical knowledge of a specific system manually read the configuration and dimensions from a two-dimensional (2D) drawing of the system. The technician may then relate the configuration and dimensions to associated objects in the real world. A technician may be able to view and print such 2D drawings using a conventional computerized document control system. A slightly more advanced approach is to display three-dimensional drawings on electronic devices. However, a visual gap still exists between the on-screen technical drawings and the real-world objects.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
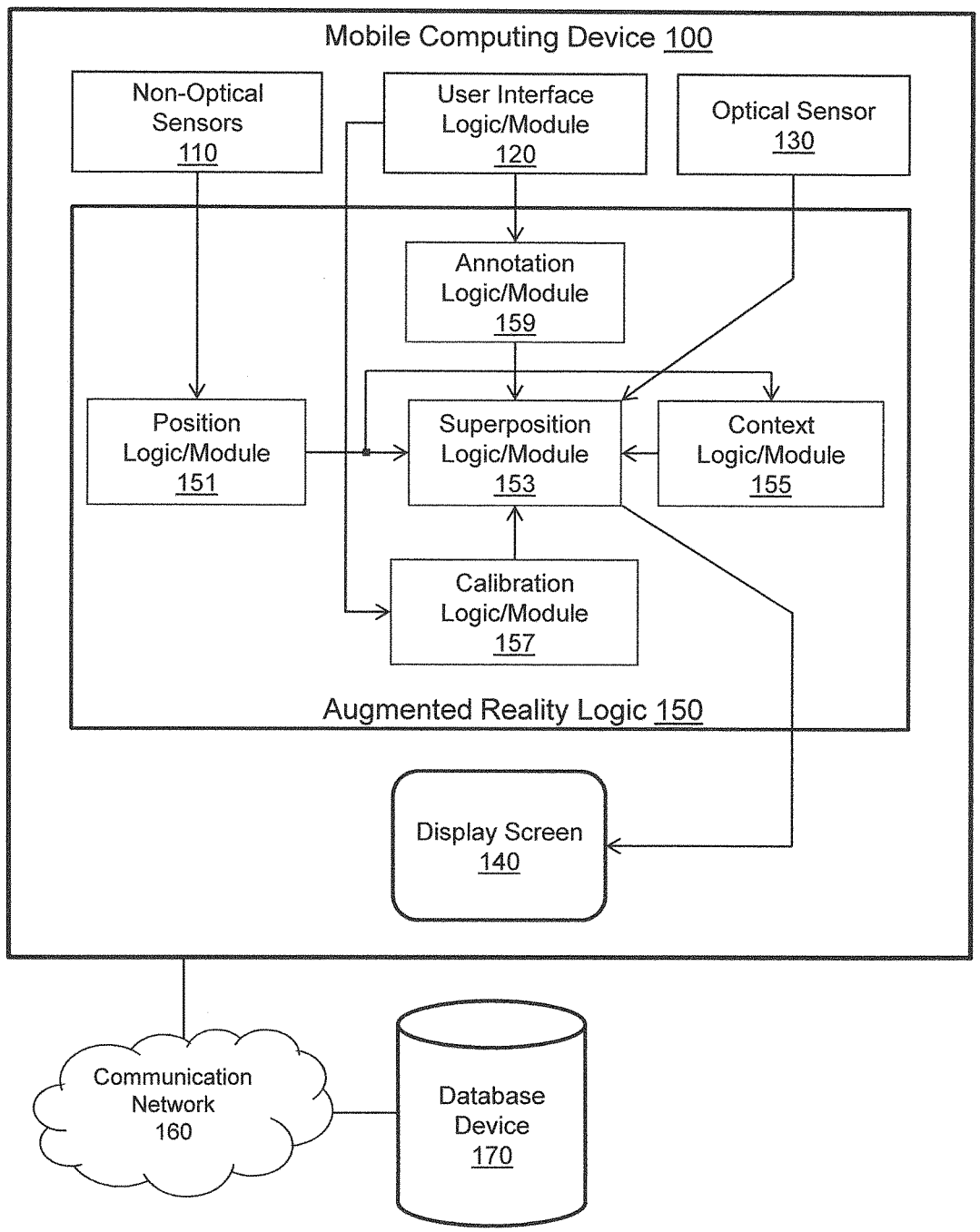
FIG. 1 illustrates one embodiment of a mobile computing device configured with augmented reality logic.

Systems, methods, and other embodiments are disclosed for superimposing spatially correlated modeled facility data over live real-world images. In one embodiment, modeled facility data can be read into a memory of a mobile computing device operated by a worker. The modeled facility data represents hidden and unhidden elements of a facility that are correlated to positions in a three-dimensional (3D) space. The modeled facility data can be read from a computerized facility system (e.g., a database device), for example, via wireless means.

In one embodiment, an overview description of an example process of the present system is as follows. For example, in a particular area of a facility, a live real-time image can be acquired by an optical sensor (e.g., a camera) of the mobile computing device and displayed on a display screen of the mobile computing device. The live real-time image may show one or more of the unhidden elements of the facility within the 3D space, as the optical sensor is pointed by the worker. Obviously, hidden elements (e.g., behind walls) are not detected by the optical sensor.

Mobile position data can be generated which represents at least a location and an orientation of the mobile computing device in the 3D space. The mobile position data is generated based on non-optical sensor readings taken by non-optical sensors of the mobile computing device. Projection parameters can be generated based at least in part on the mobile position data, and a rendered image can be generated by applying the projection parameters to the modeled facility data.

That is, the projection parameters effectively project the elements of the facility, as represented by the modeled facility data, onto the 3D space as viewed by the camera of the mobile computing device. The applied projection parameters promote spatial alignment of the rendered image with respect to the live real-time image such that the rendered image can be superimposed onto the live real-time image on the display screen. The rendered image may show one or more of the hidden and unhidden elements of the facility within the 3D space as virtual elements.

In this manner, a user (e.g., a facility worker) can use a mobile computing device (e.g., a cell phone or a tablet computer) to view hidden and unhidden elements at correct spatial positions within a field-of-view of a camera of the mobile computing device. Such a capability augments the real-world environment, thus eliminating a worker having to rely on manually reading facility drawings and translating the facility drawings to the real world in his mind's eye.

The following terms are used herein with respect to various embodiments.

The term "hidden element" or "hidden object" as used herein, refers to an element in the real world that is not normally available for visual inspection (e.g., the element is located within a wall). Such a hidden element may be virtually represented in a computerized model and may be displayed in a virtually rendered image on a display screen of a device, however.

The term "unhidden element" or "unhidden object" as used herein, refers to an element in the real world that is normally available for visual inspection (e.g., the element is mounted on a visible external surface of a wall or ceiling within a room). Such an unhidden element may be directly imaged via an optical sensor and displayed on a display screen of a device, or may be virtually represented in a computerized model and displayed in a virtually rendered image on a display screen of a device.

The term "facility" as used herein, refers to any man-made structure having one or more defined areas (e.g., rooms) which include one or more elements such as pipes/ducts (e.g., for water, gas, air, etc.), wires/cables (e.g., electrical, optical, etc.), or equipment (e.g., electronic, mechanical, etc.) that may be hidden (i.e., not normally available for visual inspection, e.g., located within a wall) or unhidden (normally available for visual inspection, e.g., mounted on a visible external surface of a wall or a ceiling within a room).

The term "position", as used herein, refers to defined spatial aspects of an element or an object as it exists in three-dimensional space. Such defined spatial aspects may include, for example, location (e.g., latitude, longitude, and altitude) and orientation (e.g., roll, pitch, yaw, and bearing relative to true north). A spatial aspect may be defined relative to a reference system such as, for example, a coordinate system.

The term "spatial alignment", as used herein, refers to a co-incidence of position (to within a certain accuracy) of representations of two or more elements or objects within a representation of a 3D space. Obviously, two or more real elements or objects cannot occupy the exact same space in the real world. The representation of the 3D space may be an optically acquired image or a virtually rendered image. The representation of the elements or objects may be optically acquired image data of the elements or objects in the real world, or virtually rendered image data of the elements or objects. The elements or objects may be hidden or unhidden.

FIG. 1 illustrates one embodiment of a mobile computing device 100 configured with augmented reality logic 150. The mobile computing device 100 may be a wireless "smart" phone, in accordance with one embodiment. The mobile computing device 100 may be a wireless tablet computer, in accordance with another embodiment. Other embodiments of the mobile computing device 100 are possible as well. In general, a user (e.g., a worker in a facility) may carry the mobile computing device 100 throughout a facility. The facility may be a factory, a school, or a power plant, for example. Other types of facilities are possible as well.

Augmented reality logic 150 within the mobile computing device 100 is configured to computerize the process of finding hidden and unhidden elements within a facility. For example, in one embodiment, augmented reality logic 150 is configured to superimpose virtual elements, associated with hidden and unhidden real-world elements within a facility, over a live real-time image displayed on a display screen of the mobile computing device 100. In general, the mobile computing device 100 of FIG. 1 is configured to perform parameter calculations, camera-matched renderings, and output composition as described herein.

Furthermore, one embodiment described herein allows navigation through a facility as well as the displaying of virtual elements, annotations, and other features (e.g., a recorded video providing instruction) overlaid onto a live real-time image. A position of a mobile computing device in three-dimensional (3D) space is determined based on non-optical sensor readings, context data, and user-controlled calibration, in accordance with one embodiment. Projection parameters are generated based on the position of the mobile computing device. The projection parameters are used to project the virtual elements of a facility (representing real hidden and unhidden elements of the facility) onto a live real-time image such that the virtual elements appear spatially aligned in the 3D space with real-world objects displayed in the live real-time image.

With reference to FIG. 1, in one embodiment, non-optical sensors 110, user interface logic (module) 120, an optical sensor 130, a display screen 140, and augmented reality logic 150 are implemented on the mobile computing device 100. The mobile computing device 100 may be configured to operably interface (e.g., wirelessly) to a communication network 160 to access a database device 170, in accordance with one embodiment.

The non-optical sensors 110 are configured to take readings with respect to various aspects of a position (e.g., location, orientation, motion) of the mobile computing device 100 in 3D space. For example, the non-optical sensors 110 may include one or more of:

- a global positioning system (GPS) receiver for sensing GPS signals;
- a cellular telephone receiver for sensing signals from cell towers;
- a barometric sensor for sensing atmospheric pressure which can be related to altitude;
- a radio frequency (RF) parametric sensor for sensing RF signals (e.g., WiFi signals) transmitted from, for example, radio beacons;
- an inertial sensor (e.g., an accelerometer) for sensing orientation of the mobile computing device;
- a compass sensor for sensing magnetic fields generated by the Earth that are related to direction; and
- a gyroscopic sensor for sensing changes in orientation of the mobile computing device.

Operating systems such as iOS and Android provide higher level orientation/location data which is calculated from a combination of sensor readings from multiple sensors (known as sensor fusion). Some embodiments may include such an operating system. For example, to obtain orientation (also known as attitude) parameters relative to a true north reference frame, raw sensor data is used from an accelerometer, a gyroscope, a magnetometer, and a combination of GPS and RF sensors.

The orientation may be relative to a local reference frame of the mobile computing device. The accelerometer reading is a sum of gravity and the actual linear acceleration of the mobile computing device caused by the user. The gravity part is split out to get the actual user-caused attitude. However, the accelerometer readings become noisy if the user moves the device while rotating the device. Different techniques can be applied to obtain a pure, responsive, and accurate orientation. For example, a simple low pass filter can be applied to readings, or both noisy accelerometer readings and drifting gyroscopic readings can be passed through a Kalman filter.

The orientation data may then be converted into a relative true north reference frame such that the orientation data may be used with the 3D modeled facility data which, in accordance with one embodiment, has vertices based on real-world coordinates. The mobile computing device determines where true north is in relation to a local device reference frame. The magnetometer readings are calibrated to filter out interference and are combined with location data obtained based on GPS or RF signals to look up the true north parameter at that moment and location. Roll, pitch, an yaw can then be determined which, along with bearing relative to true north, provide the absolute orientation of the mobile computing device in the real world. However, in some embodiments, a quaternions format or a rotation matrix format may be used for computation. For example, to transform (rotate) a vector in the 3D modeled facility data, the vector can be multiplied by the rotation quaternion and its inverse.

By knowing the position of the mobile computing device 100 in 3D space, projection techniques can be employed to display virtual facility elements that are aligned with real-world facility elements in a live real-time image displayed on the display screen 140. For example, a virtual outline of a wall (e.g., an unhidden element) of a facility can be aligned and displayed. Furthermore, a virtual representation of a water pipe (e.g., a hidden element) can be aligned and displayed.

In one embodiment, user interface logic 120 is configured to generate a graphical user interface (GUI) to facilitate user interaction with augmented reality logic 150. For example, user interface logic 120 includes program code that generates and causes the graphical user interface to be displayed based on an implemented graphical design of the interface. In response to user actions and selections via the GUI, associated aspects of augmenting a visually displayed portion of a facility with superimposed virtual elements may be manipulated. For example, a user may employ the GUI to calibrate the alignment of virtual elements of a facility with corresponding displayed real-world elements of the facility. In other embodiments, user interface logic 120 may also support user interaction with other user interfaces such as a keypad of the mobile computing device 100.

In one embodiment, user interface logic 120 is configured to facilitate receiving inputs and reading data in response to user actions. For example, user interface logic 120 may facilitate selection, reading, and inputting of modeled facility data from the database device 170. The modeled facility data may represent particular hidden and unhidden elements of a facility. The modeled facility data is stored in at least one data structure (e.g., within the database device 170). The modeled facility data may be accessed by an augmented reality application (e.g., augmented reality logic 150) on the mobile computing device 100 via the graphical user interface provided by user interface logic 120. Furthermore, in one embodiment, user interface logic 120 may be configured to facilitate the outputting and displaying of information (e.g., virtual elements, annotations), via the graphical user interface, on the display screen 140.

Referring to FIG. 1, in one embodiment, optical sensor 130 is a digital camera device including an optical detection array, a lens, and other related optics and electronics. The optical sensor 130 is configured to detect light in the visible spectrum (i.e., the part of the electromagnetic spectrum that is visible by humans) and generate digital image data, in accordance with one embodiment. In other embodiments, the optical sensor may be sensitive to light in other spectrums (or combinations thereof) such as, for example, the infrared spectrum or the ultraviolet spectrum. A focal length of the lens of the optical sensor 130 may be adjustable, in accordance with one embodiment.

In accordance with one embodiment, the display screen 140 of the mobile computing device is implemented to display views of and facilitate user interaction with a graphical user interface (GUI) generated by user interface logic 120 (e.g., for viewing and updating information associated with superimposing facility information onto a live real-time image). The graphical user interface may be associated with an augmented reality application and user interface logic 120 may be configured to generate the graphical user interface. Furthermore, in one embodiment, the display screen 140 is implemented to display a rendered image (of virtual elements) superimposed onto a live real-time image. The display screen 140 may use, for example, liquid crystal display (LCD) technology or light-emitting diode (LED) technology.

In one embodiment, the database device 170 is operably connected to the mobile computing device 100 and/or a network interface to access the database device 170 via an operable connection (e.g., a network connection). For example, in one embodiment, the database device 170 is operably connected to the mobile computing device 100 via the communication network 160 (e.g., the internet). In accordance with one embodiment, the database device 170 is configured to store and manage data structures (e.g., files or records of modeled 3D facility data) in a database system (e.g., a facility system) which can be processed by augmented reality logic 150.

With reference to FIG. 1, in one embodiment, augmented reality logic 150 is implemented on the mobile computing device 100 and includes logics for implementing various functional aspects of augmented reality logic 150. In one embodiment, augmented reality logic 150 includes position logic 151 (e.g., a position module), superposition logic 153 (e.g., a superposition module), context logic 155 (e.g., a context module), calibration logic 157 (e.g., a calibration module), and annotation logic 159 (e.g., an annotation module).

Other embodiments may provide different logics or combinations of logics that provide the same or similar functionality as the mobile computing device 100 of FIG. 1. For example, in one embodiment, augmented reality logic 150 is an executable application including algorithms and/or program modules configured to perform the functions of the logics. The application is stored in a non-transitory computer storage medium. That is, in one embodiment, the logics of augmented reality logic 150 are implemented as modules of computer-executable instructions stored on a computer-readable medium. The instructions are executable by a processor of the computing device to perform the functions described herein.

In one embodiment, position logic 151 is configured to generate mobile position data based on non-optical sensor readings taken by the non-optical sensors 110 of the mobile computing device 100. As discussed previously herein, position logic 151 may be part of an operating system of the mobile computing device 100, in accordance with one embodiment. The mobile position data represents, for example, a location and an orientation of the mobile computing device 100 in a three-dimensional (3D) space of a facility at any particular time. An accuracy of the position of the mobile computing device 100, as represented by the mobile position data, may be improved by using more, rather than fewer, of the non-optical sensors to provide sensor readings to position logic 151.

In one embodiment, superposition logic 153 is configured to generate projection parameters based at least in part on the mobile position data from position logic 151. Superposition logic 153 is also configured to generate rendered image data at least in part by applying the projection parameters to modeled facility data. The modeled facility data represents one or more hidden and unhidden elements of the facility within the 3D space as virtual elements. Superposition logic 153 is further configured to superimpose the rendered image data onto live real-time image data acquired by the mobile computing device 100 (e.g., by the optical sensor 130). The live real-time image data represents one or more of the hidden or unhidden elements of the facility within the 3D space. The applied projection parameters promote spatial alignment of the rendered image data with the live real-time image data with respect to positions within the 3D space.

As an example, a maintenance worker may be using the mobile computing device 100 to image a portion of a boiler room in a factory and display a corresponding live real-time image on the display screen 140. The boiler room exists in a 3D space, and a position of the mobile computing device 100 within that 3D space can be determined. By knowing the position (e.g., location and orientation) of the mobile computing device 100 within the 3D space, projection parameters can be generated. Generating the projection parameters can take into account optical scaling data derived from characteristics of an optical lens of the optical sensor 130 and a size of the display screen 140. For example, the characteristics of the optical lens may include a focal length, a field-of-view, a lens distortion parameter, and a zoom level.

The projection parameters can be applied to a virtual element representing electrical wiring within a wall of the boiler room, for example. The virtual element is defined by modeled facility data which can be displayed in an aligned and overlaid (superimposed) manner on the live real-time image. As a result, the maintenance worker can "see", on the display screen 140, where the electrical wiring is routed within the wall. The maintenance worker may proceed to open up the wall at the appropriate locations to replace the electrical wiring, for example.

In accordance with one embodiment, the projection parameters may be generated based on contextual default data, in addition to the mobile position data. In one embodiment, context logic 155 is configured to generate contextual default data based at least in part on the mobile position data and the modeled facility data using contextual heuristics. Context logic 155 is also configured to provide the contextual default data to superposition logic 153 to improve the spatial alignment of the rendered image data with the live real-time image data.

For example, in the case where the mobile position data provides imprecise latitude and longitude information (i.e., imprecise location data), contextual default data may be formed by context logic 155 and provided to superposition logic 153. In one embodiment, an estimated margin of error is used to effectively draw a circle around the location of the mobile computing device 100 as indicated by the mobile position data. Points within the circle are considered with respect to having a higher probability of being at the actual location of the mobile computing device 100 as compared to other points within the circle.

For example, a user holding the mobile computing device 100 is more likely to be standing in the middle of a hallway rather than inside a wall. A ranking is given to points within the circle based on distances of the points from the center of the circle and the likelihood of being the actual location of the mobile computing device 100. Contextual default data is formed by using a highest ranked point as the actual location of the mobile computing device 100. The projection parameters may be re-generated using the actual location.

As another example, in the case where the mobile position data provides imprecise altitude information, contextual default data may be formed by context logic 155 and provided to superposition logic 153. In one embodiment, a floor of the facility that the user is currently on is determined by considering the approximate altitude readings of the mobile position data and/or beacons placed at the entrance between floors. Contextual default data is then calculated by adding the height of the user (as measured from eye level to the floor when standing) to the known altitude of the current floor to update the altitude. If the user's height is unknown, the height of an average human may be used. The projection parameters may be re-generated using the updated altitude information.

In accordance with one embodiment, the projection parameters may be fine-tuned based on calibration data, once the projection parameters are initially generated based on the mobile position data and/or contextual default data. In one embodiment, calibration logic 157 is configured to improve the spatial alignment of rendered image data with live real-time image data in response to user interaction with a user interface of the mobile computing device 100 (e.g., in response to user interaction with a graphical user interface provided by user interface logic 120).

Figure 2:
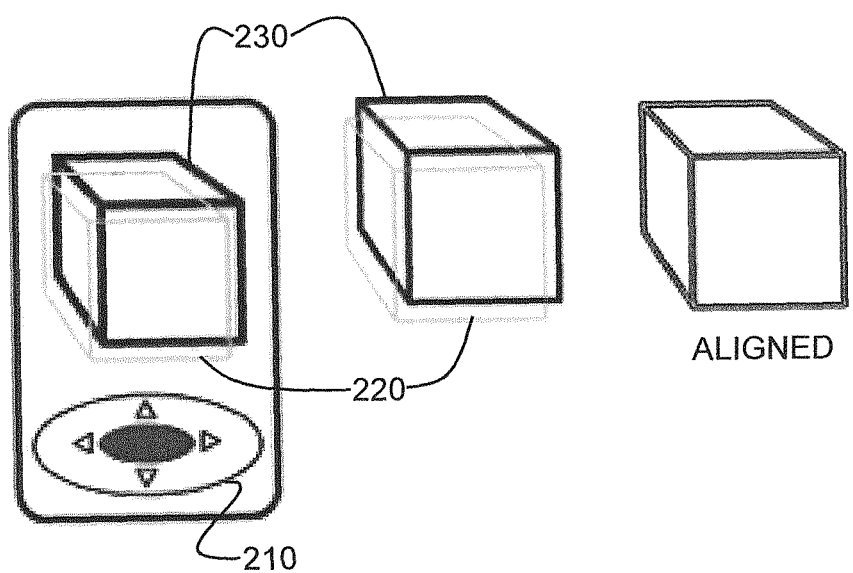
FIG. 2 illustrates a diagram showing the concept of using interactive calibration to more accurately align a virtual element to a three-dimensional space.

For example, while viewing the display screen 140, a user can enter a calibration mode and select and move a rendered image of virtual elements with respect to objects in a live real-time image to more accurately spatially align the images with respect to positions within the 3D space. Alternatively, the user can move the position of the mobile computing device 100 until the live real-time image acquired by the optical sensor 130 aligns with the rendered image. In one embodiment, the user actions generate calibration data which is used to update the projection parameters. Therefore, after calibration is complete, as the user moves the mobile computing device 100 to change the portion of the facility being imaged within a 3D space, the enhanced alignment (calibration) due to the user's actions is maintained. FIG. 2 illustrates a diagram showing the concept of using interactive calibration to more accurately align a virtual element in a three-dimensional space. An on-screen user interface 210 is used to move a displayed virtual element 220 to align with a displayed real-world element 230 (e.g., the corners between walls, ceilings, and floors).

Figure 3:
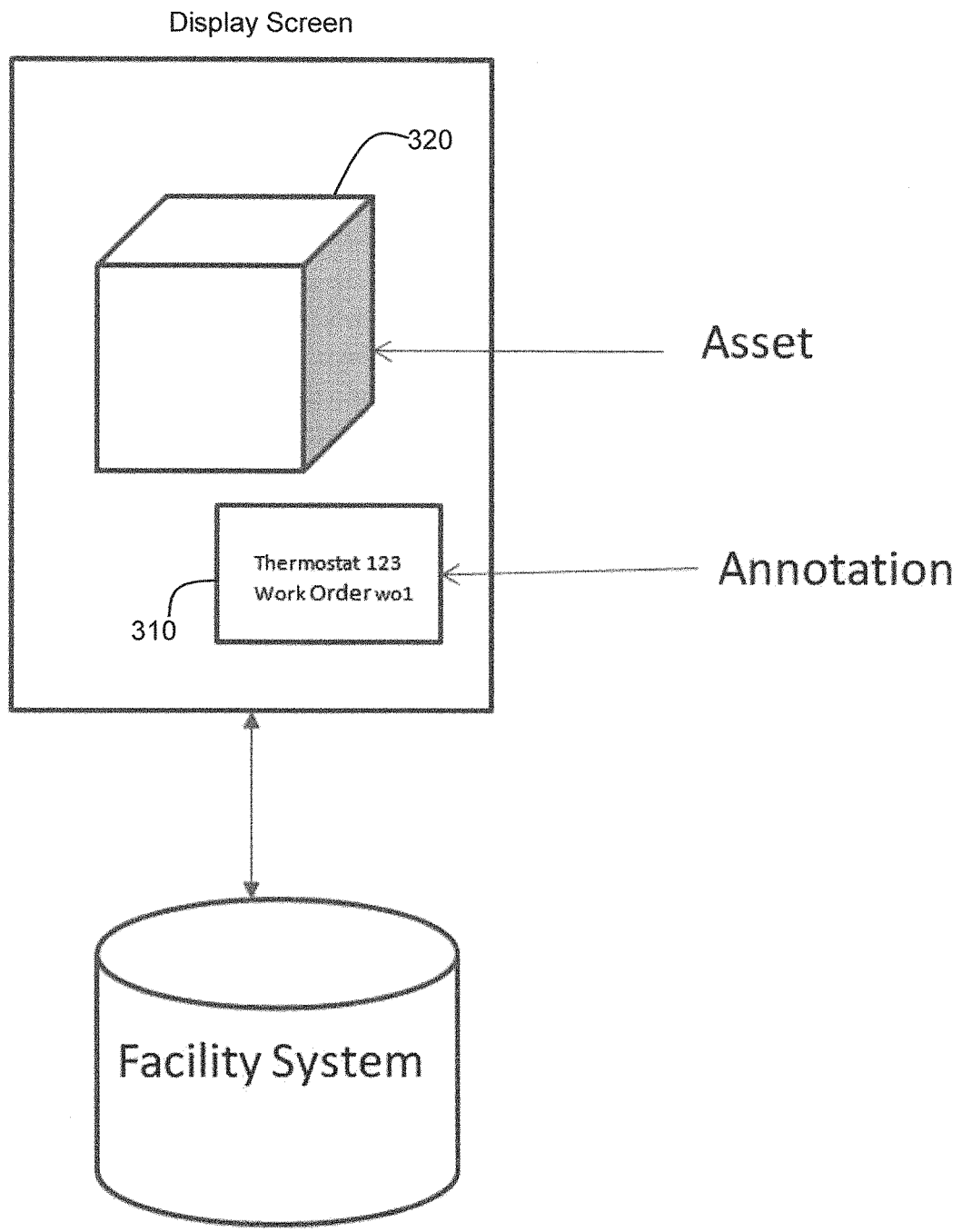
FIG. 3 illustrates a diagram showing how, in one embodiment, annotation information may be associated with a modeled asset of a facility.

In one embodiment, annotation logic 159 is configured to generate annotation data in response to user interaction with a user interface of the mobile computing device 100 (e.g., in response to user interaction with a graphical user interface provided by user interface logic 120). Furthermore, annotation logic 159 is configured to associate the annotation data with one or more of the hidden and unhidden elements of the facility represented by the modeled facility data in response to user interaction with the user interface of the mobile computing device 100. FIG. 3 illustrates a diagram showing how, in one embodiment, annotation information 310 may be associated with a modeled asset 320 of a facility by dragging the annotation information 310 over the asset 320 on a display screen of a mobile computing device.

As another example, upon viewing a virtual representation of hidden electrical wiring within a wall of the facility on the display screen 140, a user may put the mobile computing device 100 into an annotation mode and use a keypad of the mobile computing device 100 to type in the following text: "replace with copper wiring rated for 200 amperes". The user may then drag and drop the text over the virtual representation of the electrical wiring to associate the text (the annotation) with that virtual representation (the virtual element).

In accordance with one embodiment, the modeled facility data may be saved back to a facility system (e.g., database device 170) with the virtual element (representing the electrical wiring) associated with the annotation. That is, the annotation data may be stored in a non-transitory computer storage medium of a computerized facility system that is external to the mobile computing device as being associated with the virtual element. The data is transmitted via a network communication (e.g., wireless, Internet, etc). The next time a user, via the device 100, reads the modeled facility data from the database device 170 into his mobile computing device 100, the annotation will be displayed when the corresponding virtual element is displayed.

However, if the mobile computing device 100 is disconnected with the facility system, the user can still add annotations by, for example, double touching the relevant object or element on the display screen 140. The two-dimensional (2D) coordinates where the user touches the display screen 140, plus the context in the 3D model (modeled facility data), may be stored in the mobile computing device 100 to refer to the annotation. Afterwards, the user can manually or automatically synchronize the annotations back to the facility system.

In accordance with one embodiment, a user can create general annotations (e.g., comments that will be useful for other users) that are not related to a specific object or element. Such general annotations will be related with the context of the 3D model. Furthermore, annotations can provide collaboration with other users of the facility system, in accordance with one embodiment. For example, the annotations can be visualized with different colors to show that the annotations have been created by different users. Since annotations can belong to different users, an authorization mode is provided to edit the annotations. Some annotations can be read-only, and other annotations can be updated depending on the role of the user.

In this manner, the mobile computing device 100 can be used to help a user find and visualize hidden and unhidden elements within a facility as well as the spatial relationships between hidden and unhidden elements. As such, augmented reality logic 150 provides for the aligned superposition of virtual elements of modeled facility data onto a live real-time image. As a result, a user may navigate through a facility and easily view important features of the facility on a display screen 140 of the mobile computing device 100 as modeled by the facility data and/or as imaged by the optical sensor 130.

Figure 4:
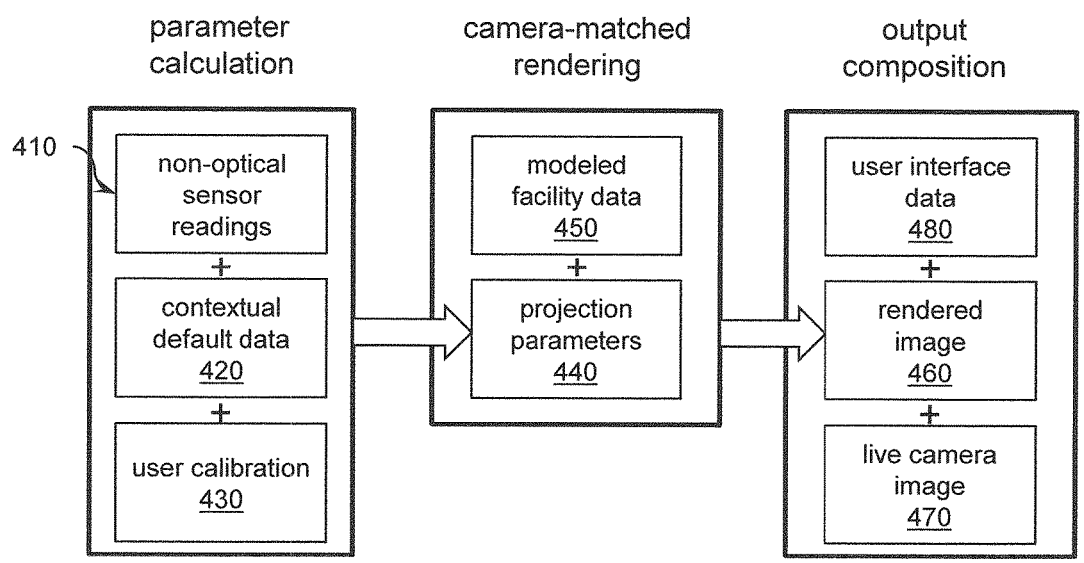
FIG. 4 illustrates a diagram showing how, in one embodiment, projection parameters are generated and used to create a rendered image which can be superimposed onto a live camera image.

As described previously herein with respect to FIG. 1, the mobile computing device 100 is configured to perform parameter calculations, camera-matched renderings, and output composition. FIG. 4 illustrates a diagram summarizing how, in one embodiment, projection parameters are generated and used to create a rendered image which can be superimposed onto a live camera image (a live real-time image). As seen in FIG. 4, non-optical sensor readings 410, contextual default data, and data from user calibration 430 may be used to generate projection parameters 440 (parameter calculation). The projection parameters 440 may be applied to modeled facility data 450 to generate a rendered image 460 of virtual elements (camera-matched rendering). The rendered image 460 may be superimposed onto a live camera image 470 (along with user interface information 480) and displayed to a user (output composition).

Figure 5:
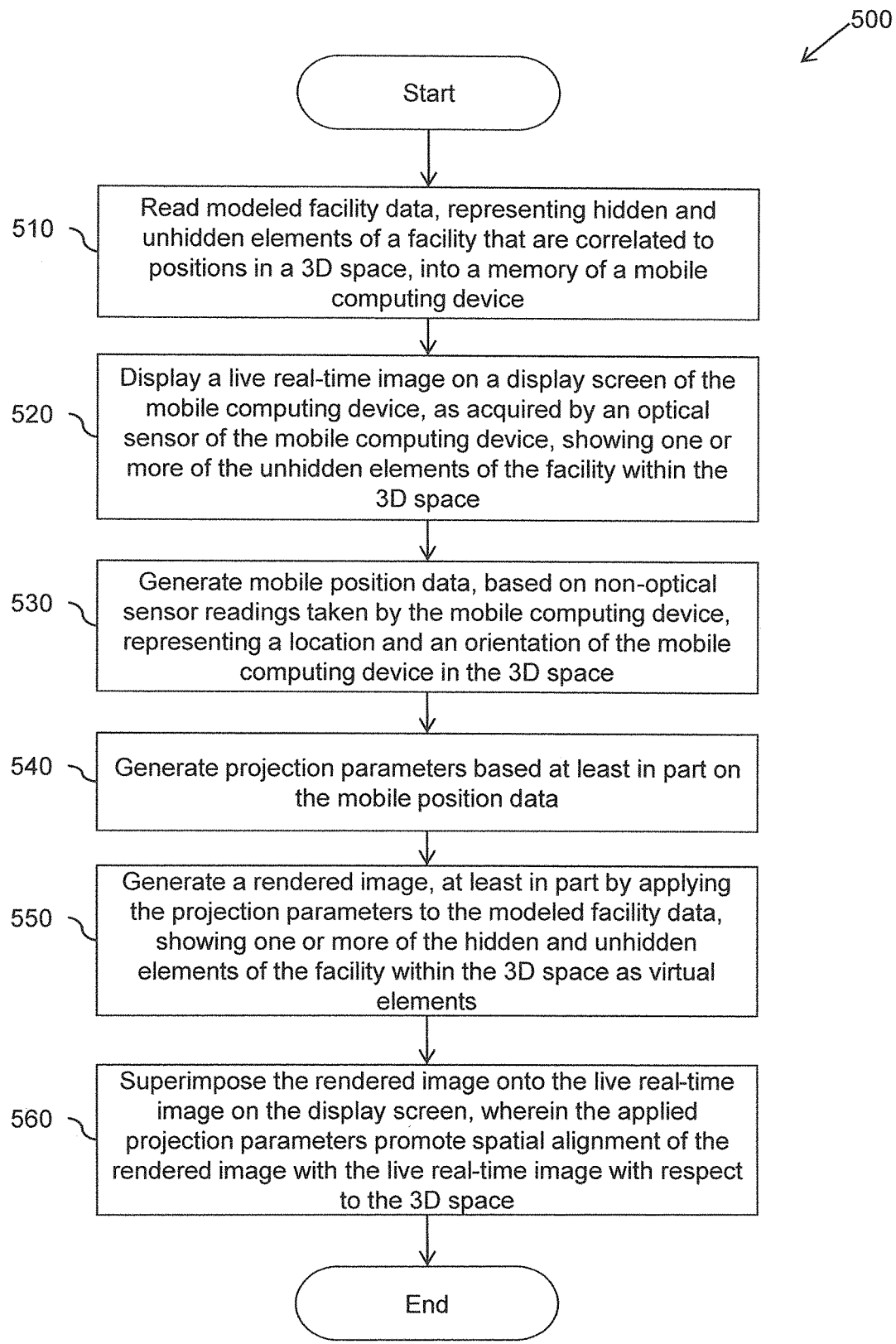
FIG. 5 illustrates one embodiment of a method, which can be performed by augmented reality logic of the mobile computing device of FIG. 1, to superimpose spatially correlated modeled facility data over live real-world images.

FIG. 5 illustrates one embodiment of a method 500, which can be performed by augmented reality logic 150 of the mobile computing device 100 of FIG. 1, to superimpose spatially correlated modeled facility data over live real-world images. Method 500 describes operation of augmented reality logic 150 and is implemented to be performed by the mobile computing device 100 of FIG. 1, or by another computing device configured with algorithms of the method 500. For example, in one embodiment, method 500 is implemented by a computing device configured to execute a computer application by using at least a processor. The computer application is configured to process data in electronic form and includes stored executable instructions that perform the functions of at least the method 500 and/or its equivalents.

The method 500 will be described from the perspective that method 500 is performed by the mobile computing device 100 of FIG. 1 and at least a processor of the mobile computing device 100 that performs the described actions. As will be described herein, by determining the position of a user's mobile computing device 100, modeled facility data can be matched up with live real-time image data to aid the user in navigating through a facility and finding hidden elements within the facility. In one embodiment, augmented reality logic 150 is configured to perform the processing associated with creating a composite or superimposed image that can be displayed on a display screen 140 of the mobile computing device 100. The composite or superimposed image remains correlated to a three-dimensional (3D) space as the mobile computing device 100 is moved around within that 3D space.

Upon initiating method 500, at block 510, modeled facility data is read into a memory of the mobile computing device 100. In one embodiment, the modeled facility data may be read from the database device 170 via the communication network 160. The modeled facility data is maintained in a data structure and represents hidden and unhidden elements of a facility that are correlated to positions in 3D space. In one embodiment, reading of the modeled facility data is facilitated by user interface logic 120. For example, the user may interact with a graphical user interface provided by user interface logic 120 to access the database device 170 and select a file of modeled facility data stored on the database device 170.

At block 520, a live real-time image is displayed on a display screen 140 of the mobile computing device 100. The live real-time image is acquired by an optical sensor 130 of the mobile computing device 100 and shows one or more of the unhidden elements of the facility within the 3D space. The optical sensor 130 may be a camera, in accordance with one embodiment. At block 530, mobile position data is generated which represents a position (e.g., a location and an orientation) of the mobile computing device 100 in the 3D space. The mobile position data is generated by position logic 151 operating on (i.e., processing) non-optical sensor readings taken by the non-optical sensors 110 of the mobile computing device. In accordance with one embodiment, the non-optical sensors are continuously generating and outputting sensor readings to position logic 151 during operation of augmented reality logic 150.

At block 540, projection parameters are generated based at least in part on the mobile position data. In one embodiment, the mobile position data is communicated from position logic 151 to superposition logic 153. Superposition logic 153 processes the mobile position data to generate the projection parameters. Generating the projection parameters can take into account optical scaling data derived from characteristics of an optical lens of the optical sensor 130 and a size of the display screen 140. For example, the characteristics of the optical lens may include a focal length, a field-of-view, a lens distortion parameter, and a zoom level. In certain embodiments, the projection parameters may be generated based also on contextual default data (from context logic 155) and/or calibration data (from calibration logic 157) as previously described herein with respect to FIG. 1. The contextual default data may improve an accuracy of, for example, a latitude, a longitude, and an altitude of the mobile communication device 100 beyond that provided by the mobile position data alone.

At block 550, a rendered image is generated by superposition logic 153 at least in part by applying the projection parameters to the modeled facility data. The resultant rendered image shows one or more of the hidden and unhidden elements of the facility within the 3D space as virtual elements. At block 560, the rendered image is superimposed onto the live real-time image on the display screen 140 by superposition logic 153. The applied projection parameters promote spatial alignment of the rendered image with the live real-time image with respect to the 3D space. That is, any virtual object in the rendered image is spatially aligned (with respect to at least location and orientation) with a corresponding real-world object in the live image.

In this manner, a user of a mobile computing device can readily view hidden elements of a facility on a display screen of the mobile computing device. The user simply commands the mobile computing device to enter an augmented reality mode and points a camera of the mobile computing device to image real-world objects within the facility. As long as particular hidden and unhidden elements of the facility are modeled, virtual representations of those hidden and unhidden objects may be superimposed onto live real-time image data in spatial alignment with the real-world objects being imaged.

Figure 6:
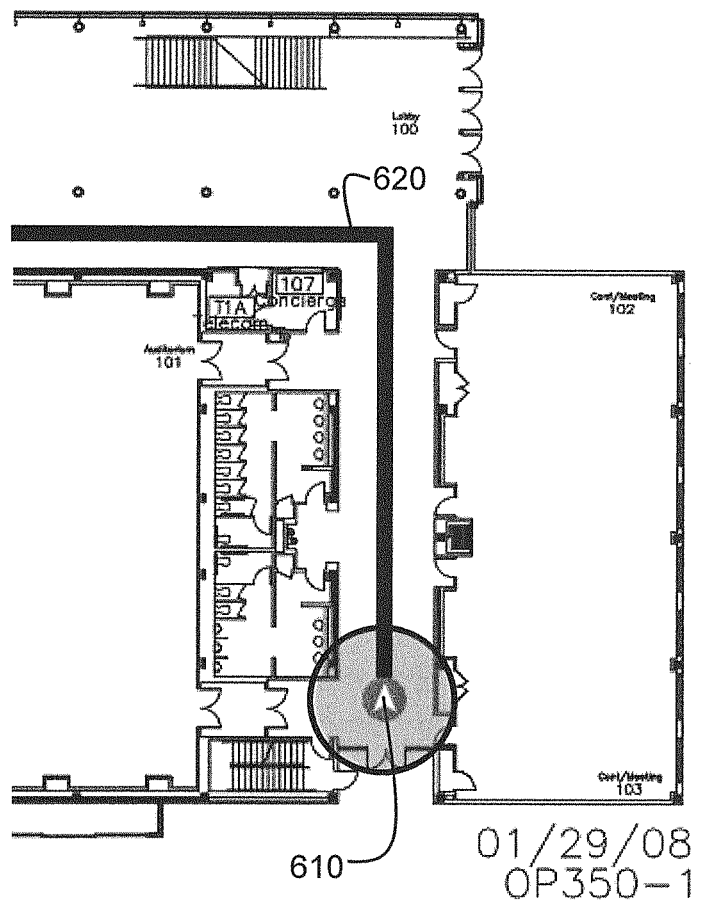
FIGS. 6-15 illustrate a sequence of diagrams showing an example of how to find and replace a thermostat device within a facility using the mobile computing device of FIG. 1.
Figure 7:
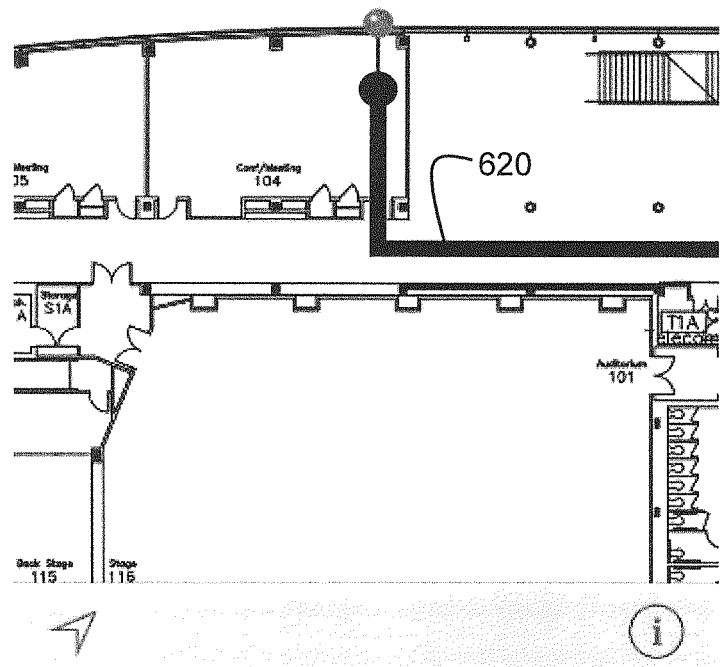

FIGS. 6-15 illustrate diagrams showing an example of how to find and replace a thermostat device within a facility using the mobile computing device 100 of FIG. 1. In FIG. 6, a user viewing a display screen of the mobile computing device is able to view his current location 610 with respect to a floor plan of a facility in a "floor plan" mode. The user is also able to view a navigation path 620 directing the user to the thermostat device that is to be replaced. In FIG. 7, a last portion of the navigation path 620 is shown as displayed by the mobile computing device.

Figure 8:
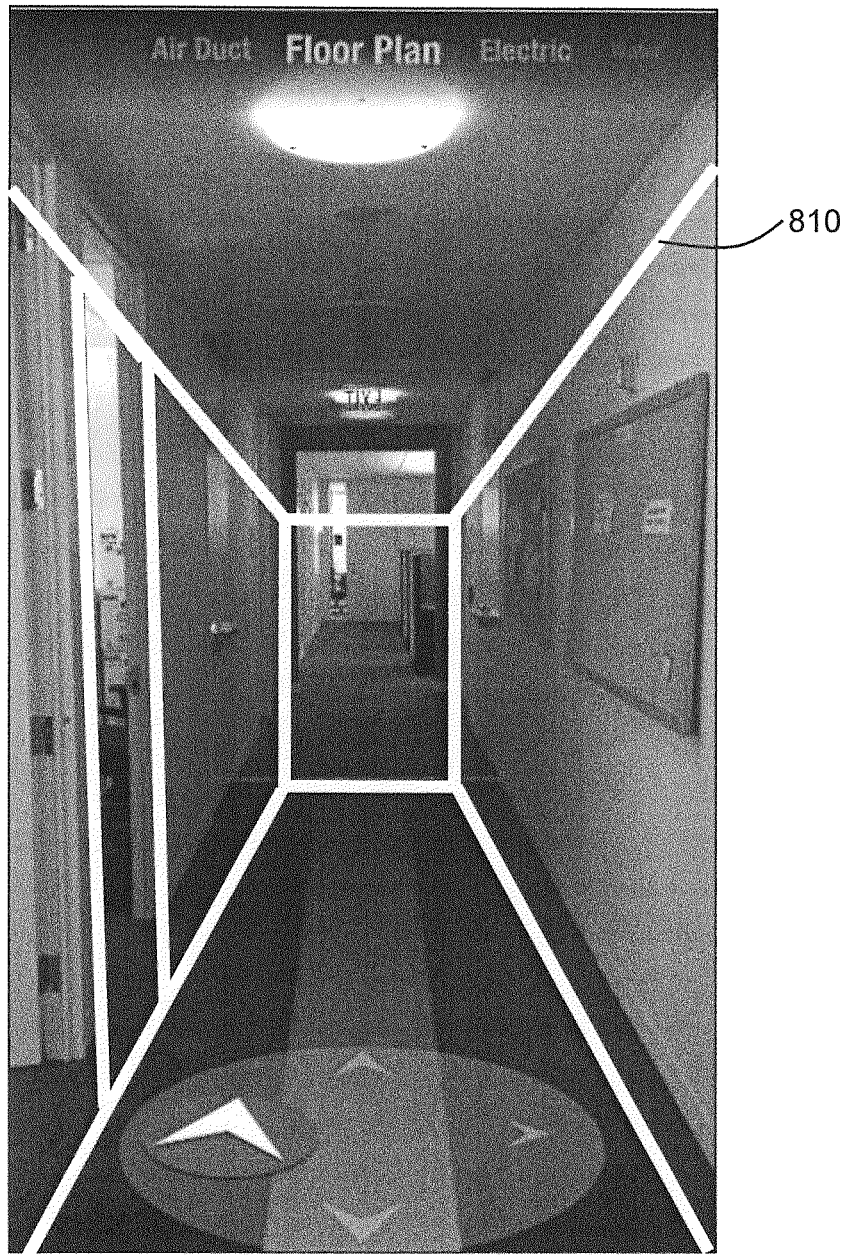
Figure 9:
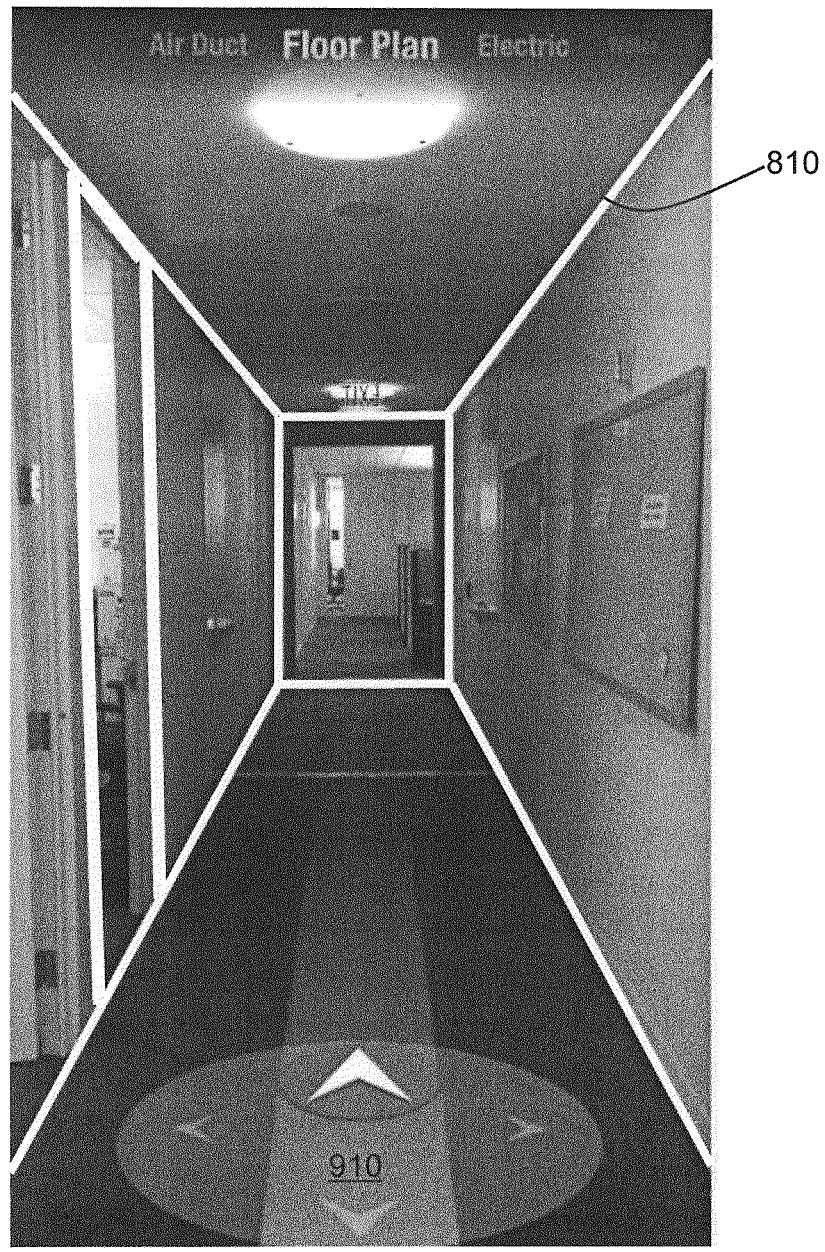

As shown in FIG. 8, as the user approaches the room of the facility having the thermostat device to be replaced, the user may switch from a "navigation" mode to a live imaging "floor plan" mode. Virtual elements (thick white lines) 810 showing the outline of the walls and doors (unhidden elements) are displayed on the mobile computing device. As seen in FIG. 8, the virtual elements 810 are superimposed onto a live real-time image but are not properly aligned. As shown in FIG. 9, a user interacts with the on-screen user interface 910 to calibrate and align the virtual elements 810 to corresponding elements in the live real-time image.

Figure 10:

As shown in FIG. 10, the user switches from "floor plan" mode to "electric" mode on the mobile computing device. Virtual elements (thick black lines) 1010 are displayed that show where hidden electrical wiring is routed within the floor, walls, and ceiling of the facility. Due to the previous calibration performed with respect to FIG. 9, the virtual elements 1010 are properly aligned with the live real-time image. In this manner, the user can see where the electrical wiring is routed.

Figure 11:
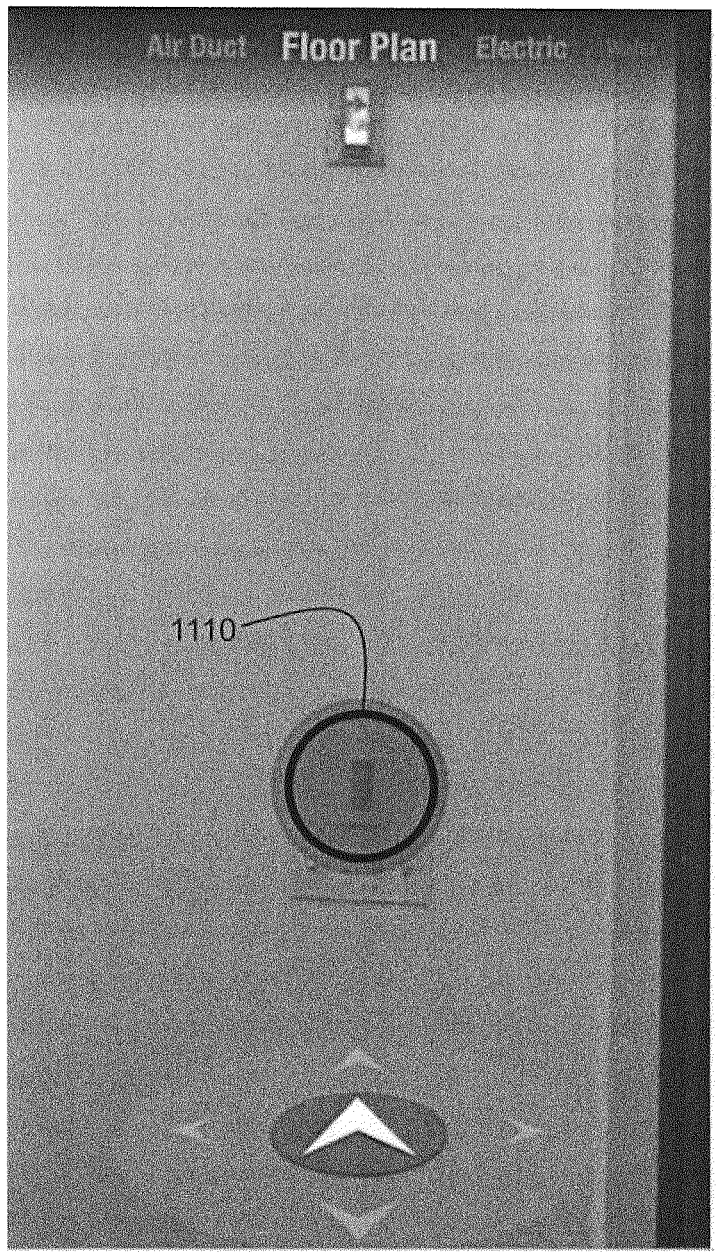
Figure 12:
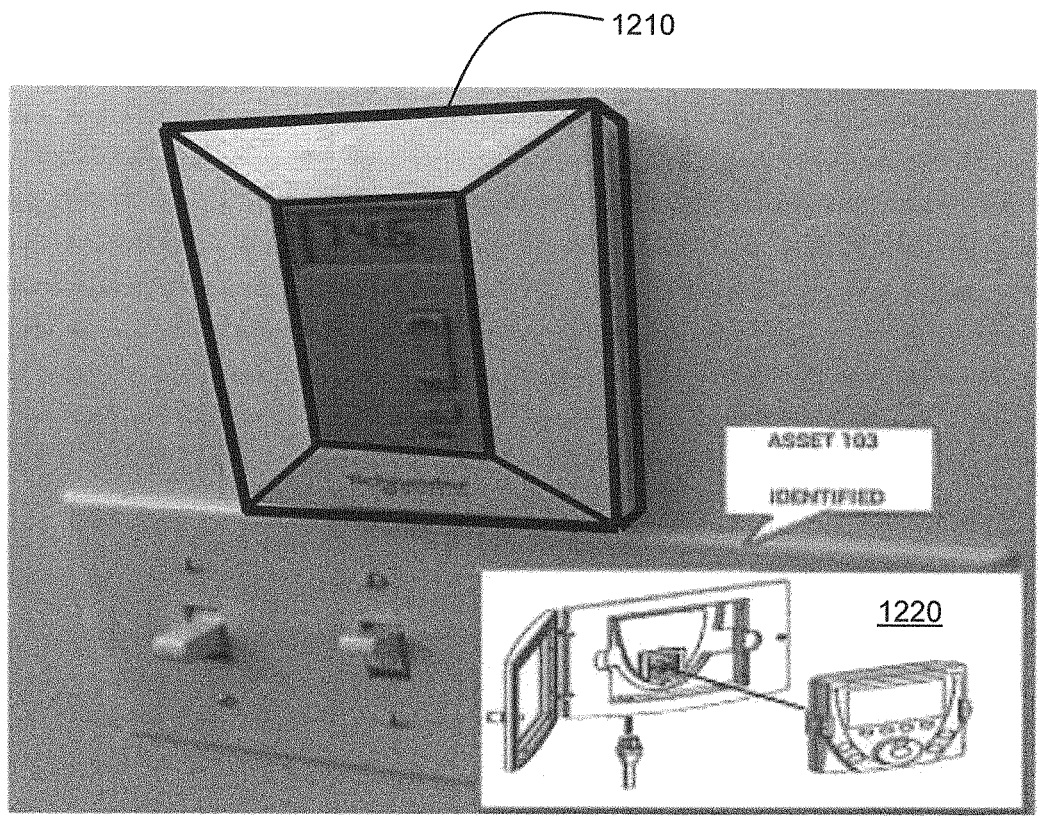

As the user approaches the thermostat device to be replaced, the thermostat device is encircled with a thick, dark line 1110 on the display screen of the mobile computing device as shown in FIG. 11. The thick, dark line 1110 indicates that the user is currently imaging the proper device (i.e., the correct thermostat device to be replaced). In FIG. 12, virtual elements (thick black lines) 1210 are superimposed over the live real-time image of the thermostat device, indicating proper alignment of the modeled data with the thermostat device. Furthermore, a virtual diagram 1220 of the thermostat device is displayed, indicating how to access the thermostat device for replacement.

Figure 13:
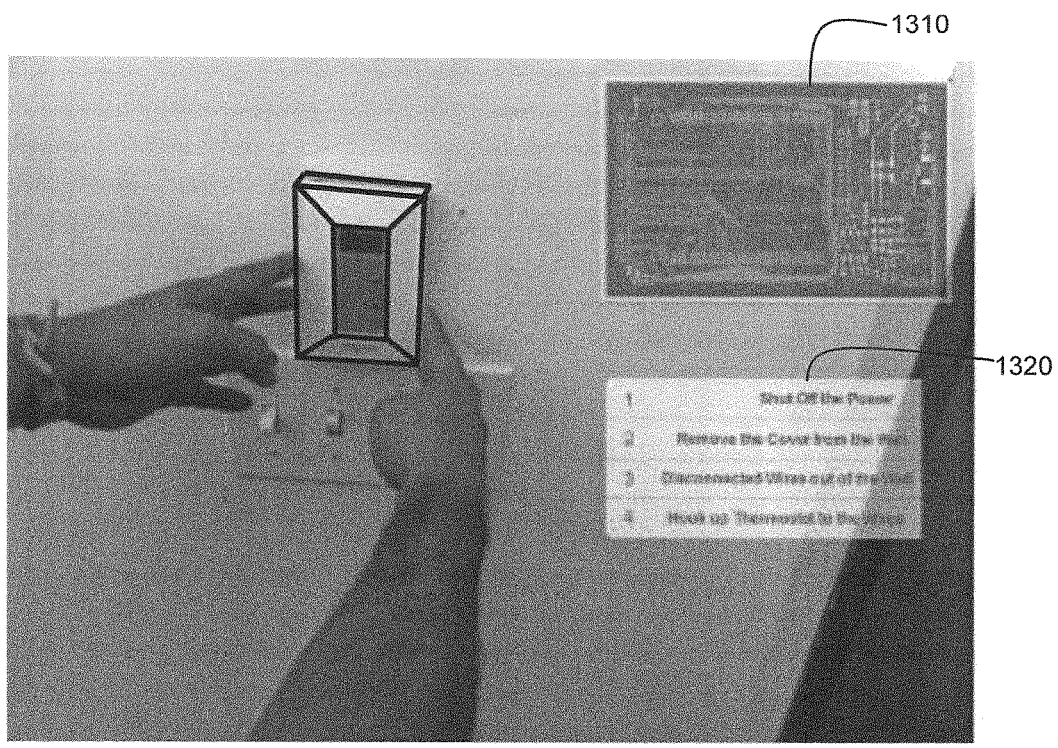
Figure 14:
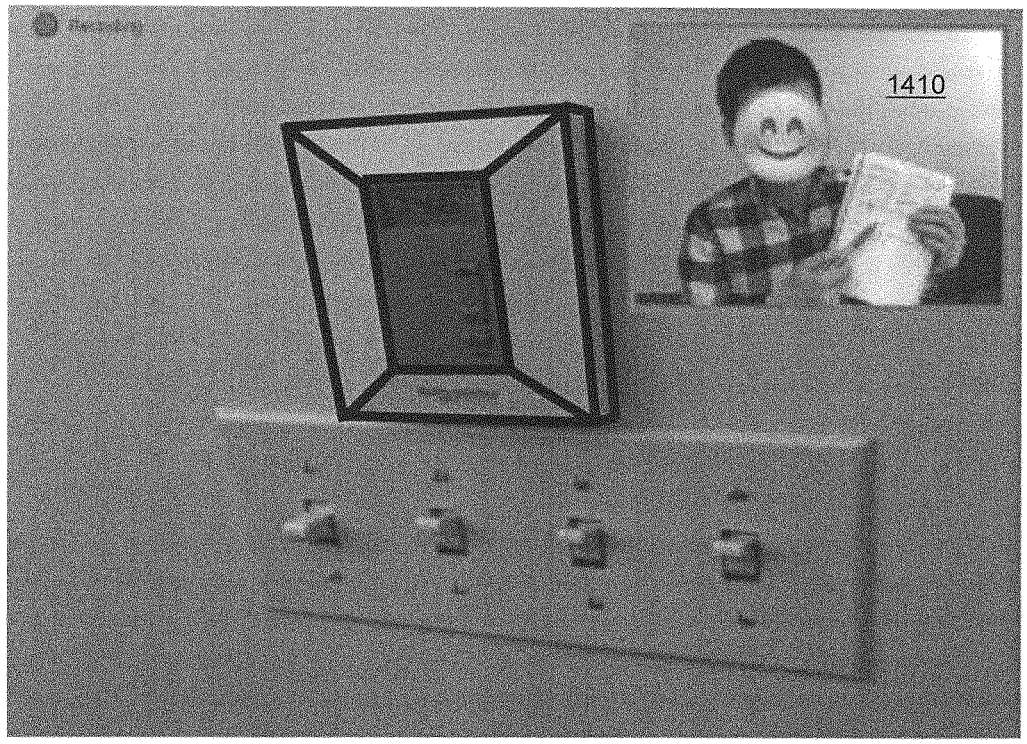

In FIG. 13, a printed circuit board 1310 of the thermostat device and instructions 1320 for replacing the thermostat device are superimposed over the live real-time image on the display screen of the mobile computing device. The user may follow the instructions 1320 to replace the thermostat device. As an alternative, as shown in FIG. 14, a pre-recorded instructional video 1410 is superimposed onto the live real-time image to instruct the user how to replace the thermostat device. As a further alternative, a live video call may be placed to an expert. Live video of the expert can be displayed in place of the pre-recorded instructional video 1410.

Figure 15:
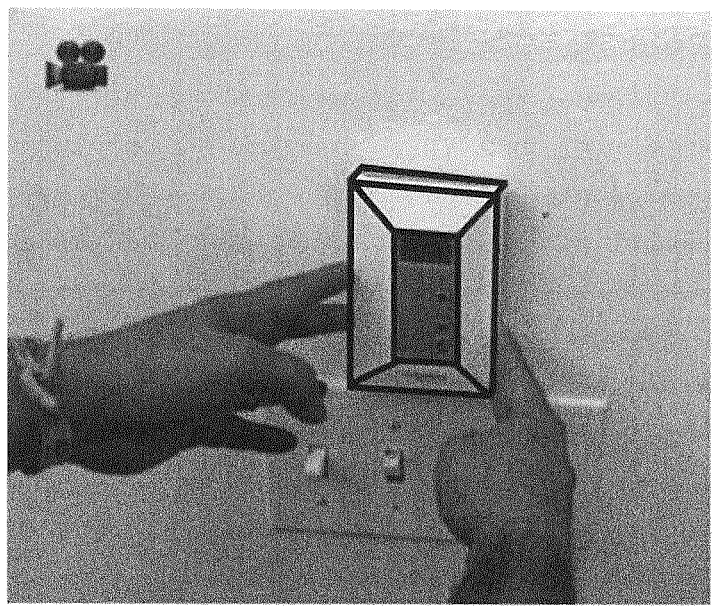

In FIG. 15, a completed work order, associated with replacing the thermostat device, is shown as displayed on the mobile computing device. The completed work order shows a work order number, a summary statement, a resolution statement, and recorded video showing the actual replacement procedure performed by the user. In one embodiment, the completed work order may be saved from the mobile computing device to the facility system (e.g., the database device 170). In this manner, a supervisor or facility manager may subsequently access the work order from the facility system and review the work order.

In this manner, a user (e.g., a facility maintenance worker) can use the augmented reality capability on a mobile computing device to aid him in his work. The user can navigate to the proper work location within the facility and virtual elements may be superimposed over a live real-time image to help the user verify his location and find hidden elements. Furthermore, instructional information may be displayed to the user to help the user perform his work.

Systems, methods, and other embodiments have been described that are configured to superimpose spatially correlated modeled facility data over live real-world images on a mobile computing device. In one embodiment, position logic is configured to generate mobile position data based on non-optical sensor readings taken by the mobile computing device. The mobile position data represents at least a location and an orientation of the mobile computing device in a three-dimensional (3D) space of a facility. Superposition logic is configured to generate projection parameters based on the mobile position data and generate rendered image data by applying the projection parameters to modeled facility data. The modeled facility data represents one or more hidden and unhidden elements of the facility within the 3D space as virtual elements. The superposition logic is also configured to superimpose the rendered image data onto live real-time image data acquired by the mobile computing device. The live real-time image data represents one or more of the unhidden elements of the facility within the 3D space. The applied projection parameters promote spatial alignment of the rendered image data with the live real-time image data with respect to positions within the 3D space.

Computing Device Embodiment

Figure 16:
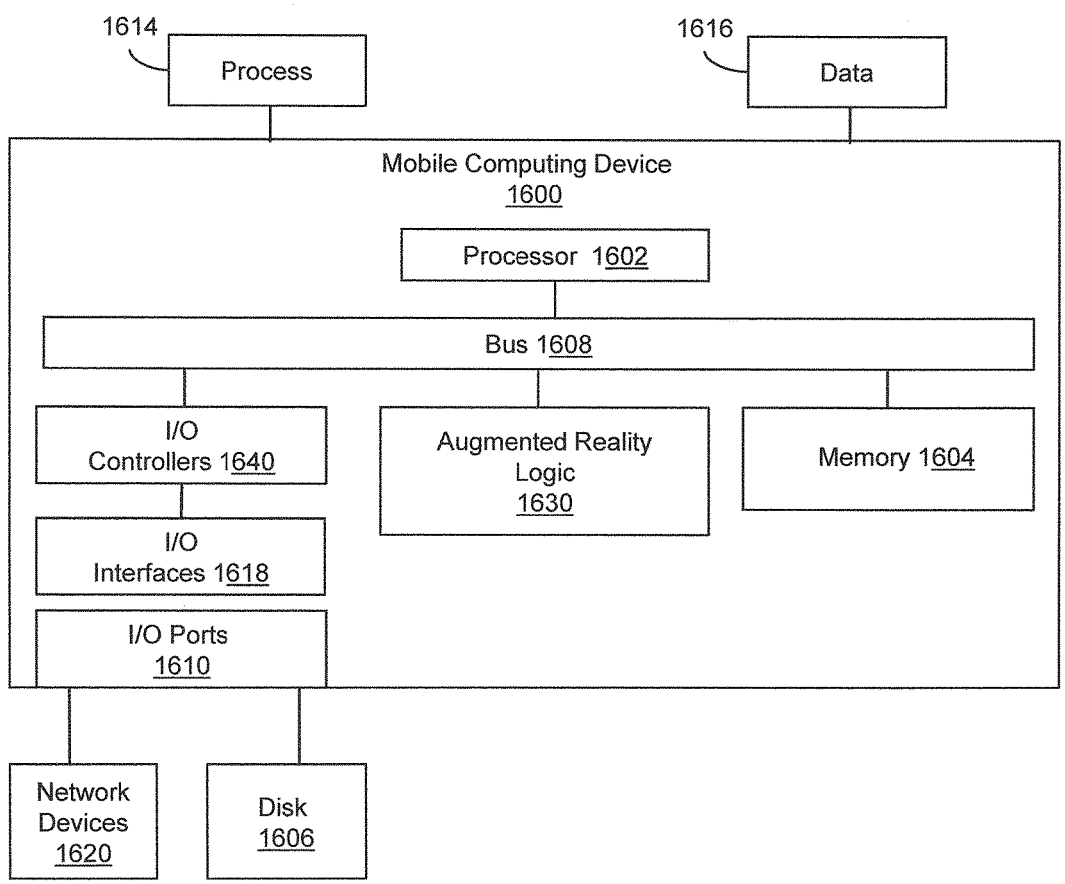
FIG. 16 illustrates one embodiment of a mobile computing device upon which augmented reality logic may be implemented.

FIG. 16 illustrates an example of a computing device that is configured and/or programmed with one or more of the example systems and methods described herein, and/or equivalents. FIG. 16 illustrates one example embodiment of a computing device upon which an embodiment of augmented reality logic may be implemented. The example computing device may be a mobile computing device 1600 that includes a processor 1602, a memory 1604, and input/output ports 1610 operably connected by a bus 1608.

In one example, the mobile computing device 1600 may include augmented reality logic 1630 (corresponding to augmented reality logic 150 from FIG. 1) configured with a programmed algorithm as disclosed herein to superimpose a rendered image, showing hidden and unhidden modeled elements of a facility, onto a live real-time image of the facility in a spatially aligned manner. In different examples, the logic 1630 may be implemented in hardware, a non-transitory computer-readable medium with stored instructions, firmware, and/or combinations thereof. While the logic 1630 is illustrated as a hardware component attached to the bus 1608, it is to be appreciated that in other embodiments, the logic 1630 could be implemented in the processor 1602, a module stored in memory 1604, or a module stored in disk 1606.

In one embodiment, logic 1630 or the mobile computing device 1600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the superposition of hidden and unhidden modeled facility elements onto a live real-time image, as correlated to a 3D space of a facility. The means may also be implemented as stored computer executable instructions that are presented to mobile computing device 1600 as data 1616 that are temporarily stored in memory 1604 and then executed by processor 1602.

Logic 1630 may also provide means (e.g., hardware, non-transitory computer-readable medium that stores executable instructions, firmware) for facilitating the superposition of hidden and unhidden modeled facility elements onto a live real-time image.

Generally describing an example configuration of the mobile computing device 1600, the processor 1602 may be a variety of various processors including dual microprocessor and other multi-processor architectures. A memory 1604 may include volatile memory and/or non-volatile memory. Non-volatile memory may include, for example, ROM, PROM, and so on. Volatile memory may include, for example, RAM, SRAM, DRAM, and so on.

A storage disk 1606 may be operably connected (wired or wirelessly) to the mobile computing device 1600 via, for example, an input/output interface (e.g., card, device) 1618 and an input/output port 1610. The disk 1606 may be, for example, a magnetic disk drive, a solid state disk drive, a floppy disk drive, a tape drive, a Zip drive, a flash memory card, a memory stick, and so on. Furthermore, the disk 1606 may be a CD-ROM drive, a CD-R drive, a CD-RW drive, a DVD ROM, and so on. The memory 1604 can store a process 1614 and/or a data 1616, for example. The disk 1606 and/or the memory 1604 can store an operating system that controls and allocates resources of the mobile computing device 1600.

The mobile computing device 1600 may interact with input/output devices via the i/o interfaces 1618 and the input/output ports 1610. Input/output devices may be, for example, a keyboard, a microphone, a pointing and selection device, cameras, video cards, displays, the disk 1606, the network devices 1620, and so on. The input/output ports 1610 may include, for example, serial ports, parallel ports, and USB ports.

The mobile computing device 1600 can operate in a network environment and thus may be connected to the network devices 1620 via the i/o interfaces 1618, and/or the i/o ports 1610. Through the network devices 1620, the mobile computing device 1600 may interact with a network. Through the network, the mobile computing device 1600 may be logically connected to remote computers. Networks with which the mobile computing device 1600 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a mobile computing device, the method comprising:
    reading modeled facility data stored by a remote database device that is external to the mobile computing device and forms part of a computerized facility system, over a wireless communication network, into a memory of the mobile computing device, wherein the modeled facility data represents a hidden element and an unhidden element as virtual elements of a facility that are spatially correlated to positions in a three-dimensional space;
    displaying a live real-time image on a display screen of the mobile computing device, as acquired by an optical sensor of the mobile computing device, showing at least a live image of the unhidden element of the facility represented by the modeled facility data within the three-dimensional space;
    generating mobile position data, based on non-optical sensor readings taken by the mobile computing device, representing at least a location and an orientation of the mobile computing device in the three-dimensional space;

generating projection parameters based at least in part on: (i) the mobile position data, (ii) optical scaling data, derived from characteristics of an optical lens of the optical sensor of the mobile computing device, and (iii) a size of the display screen of the mobile computing device, wherein the projection parameters are data relating a spatial arrangement of the virtual element representing the unhidden element of the facility in the modeled facility data relative to a spatial arrangement of the live image of the unhidden element of the facility appearing in the live real-time image, according to a view of the optical sensor, for projecting and spatially aligning the virtual elements representing the hidden element of the facility and the unhidden element of the facility from the modeled facility data onto locations corresponding to the hidden element and the unhidden element in the live real-time image;

generating a rendered image, at least in part by applying the projection parameters to the modeled facility data, showing the virtual elements representing the hidden element and the unhidden element of the facility from the view of the optical sensor within the three-dimensional space; and superimposing the rendered image onto the live real-time image on the display screen based on at least the applied projection parameters for spatially aligning the virtual elements representing the unhidden element and the hidden element of the rendered image with the locations of the unhidden element and the hidden element in the live real-time image.

2. The method of claim 1, further comprising improving the spatial alignment in response to an input that interactively aligns the rendered image to the live real-time image on the display screen via a user interface of the mobile computing device.

3. The method of claim 1, further comprising:
generating annotation data in response to user interaction with a user interface of the mobile computing device;
associating the annotation data with one or more of the virtual elements representing the hidden element and the unhidden element of the facility from the modeled facility data in response to user interaction with the user interface; and
displaying the annotation data on the display screen proximate a displayed virtual element representing one or more of the hidden element and the unhidden element.

4. The method of claim 1, further comprising:
generating annotation data in response to user interaction with a user interface of the mobile computing device;
associating the annotation data with one or more of the virtual elements representing the hidden element and the unhidden element of the facility represented by the modeled facility data in response to user interaction with the user interface; and
storing the annotation data, as being associated with the one or more of the virtual elements representing the hidden element and the unhidden element of the facility, in a non-transitory computer storage medium of a computerized facility system that is external to the mobile computing device.

5. The method of claim 1, wherein the non-optical sensor readings include at least one of global positioning system sensor readings, cell tower triangulation sensor readings, barometric sensor readings, radio frequency parametric sensor readings, inertial sensor readings, compass sensor readings, and gyroscopic sensor readings.

6. The method of claim 1, wherein the characteristics of the optical lens of the optical sensor includes at least one of a focal length, a field-of-view, a lens distortion, and a zoom level.

7. The method of claim 1, further comprising generating the projection parameters further based on contextual default data to improve the spatial alignment.

8. The method of claim 7, wherein the contextual default data improves an accuracy of latitude and longitude data of the mobile position data.

9. The method of claim 7, wherein the contextual default data improves an accuracy of altitude data of the mobile position data.

10. A mobile computing device, comprising:
a display screen;
an optical sensor that acquires a live real-time image to be displayed by the display screen;
a non-optical sensor;
at least one computer processor; and
a non-transitory computer readable medium storing instructions that, when executed by the at least one computer processor, cause the mobile computing device to:
read modeled facility data stored by a remote database device that is external to the mobile computing device and forms part of a computerized facility system, over a wireless communication network, into a memory of the mobile computing device, wherein the modeled facility data includes a virtual element representing a hidden element of the facility and a virtual element representing an unhidden element of the facility that are spatially correlated to positions in a three-dimensional space;
generate mobile position data based on non-optical sensor readings taken by the non-optical sensor of the mobile computing device, wherein the mobile position data represents at least a location and an orientation of the mobile computing device in a three-dimensional space of a facility;
generate projection parameters based at least in part on mobile position data stored in a database, wherein the projection parameters are data representing a spatial arrangement of the virtual element representing the unhidden element of the facility represented by modeled facility data, relative to a spatial arrangement of a live image of the unhidden element of the facility appearing in the live real-time image acquired by the optical sensor, according to a view of the optical sensor, for projecting and spatially aligning the virtual element representing the unhidden element and the virtual element representing the hidden element from the modeled facility data onto locations corresponding to the live image of the unhidden element and a position of the hidden element in the live real-time image,
generate a rendered image at least in part by applying the projection parameters to the modeled facility data representing the virtual element representing the unhidden element and the virtual element representing the hidden element of the facility within the three-dimensional space, and
superimpose the rendered image onto the live real-time image acquired by the optical sensor of the mobile computing device, wherein the live real-time image includes the live image of the unhidden element of the facility within the three-dimensional space, and wherein the virtual element representing the hidden element and the virtual element representing the unhidden element of the modeled facility in the rendered image are spatially aligned with respective locations of the position of the hidden element and the live image of the unhidden element in the live real-time image within the three-dimensional space.

11. The mobile computing device of claim 10, further comprising instructions stored in the non-transitory computer-readable medium that, when executed by the at least one computer processor, cause the mobile computing device to:
  generate contextual default data based at least in part on the mobile position data and the modeled facility data; and
  use the generated contextual default data to improve spatial alignment of the rendered image with the live real-time image.

12. The mobile computing device of claim 10, further comprising instructions stored in the non-transitory computer-readable medium that, when executed by the at least one computer processor, cause the mobile computing device to improve spatial alignment of the rendered image with the live real-time image in response to user interaction with a user interface of the mobile computing device.

13. The mobile computing device of claim 10, further comprising instructions stored in the non-transitory computer-readable medium that, when executed by the at least one processor, cause the mobile computing device to:
  generate annotation data in response to user interaction with a user interface of the mobile computing device; and
  associate the annotation data with one or more of the virtual element representing the hidden element and the virtual element representing the unhidden element of the facility represented by the modeled facility data in response to user interaction with the user interface of the mobile computing device.

14. The mobile computing device of claim 10, wherein the display screen is configured to display the rendered image data superimposed onto the live real-time image data.

15. The mobile computing device of claim 10, wherein the projection parameters are further based on at least optical scaling data, derived from: (i) characteristics of an optical lens of the optical sensor of the mobile computing device, and (ii) a size of the display screen of the mobile computing device, to improve the spatial alignment.

16. A non-transitory computer-readable medium storing computer-executable instructions that, when executed by at least one computer processor of a mobile computing device, cause the mobile computing device to:
  read modeled facility data stored by a remote database device that is external to the mobile computing device and forms part of a computerized facility system, over a wireless communication network, and store the modeled facility data into a memory of the mobile computing device, wherein the modeled facility data includes a virtual element representing a hidden element of the facility and a virtual element representing an unhidden element of the facility that are spatially correlated to positions in a three-dimensional space;
  generate mobile position data based on non-optical sensor readings taken by the mobile computing device, wherein the mobile position data represents at least a location and an orientation of the mobile computing device in a three-dimensional space of a facility;
  generate projection parameters based at least in part on the mobile position data, wherein the projection parameters are data representing a spatial arrangement of the virtual element representing the an unhidden element of the facility represented by the modeled facility data read from the remote database, relative to a spatial arrangement of a live image of the unhidden element of the facility appearing in a live real-time image acquired by an optical sensor of the mobile computing device, according to a view of the optical sensor, for projecting and spatially aligning a virtual element representing the hidden element and the virtual element representing the unhidden element from the modeled facility data of the facility onto locations corresponding to the unhidden element and the hidden element in the live real-time image;
  generate a rendered image at least in part by applying the projection parameters to the modeled facility data representing the virtual element representing the unhidden element and the virtual element representing the hidden element of the facility within the three-dimensional space; and
  superimpose the rendered image onto the live real-time image acquired by the optical sensor of the mobile computing device, wherein the live real-time image includes the live image of the unhidden element of the facility within the three-dimensional space, and wherein the virtual element representing the hidden element and the virtual element representing the unhidden element of the modeled facility in the rendered image are spatially aligned with respective locations of the position of the hidden element and the live image of the unhidden element in the live real-time image within the three-dimensional space.

17. The non-transitory computer-readable medium of claim 16, further storing instructions that, when executed by the at least one processor, cause the mobile computing device to:
  generate contextual default data based at least in part on the mobile position data and the modeled facility data; and
  improve a spatial alignment of the rendered image with the live real-time image based on the contextual default data.

18. The non-transitory computer-readable medium of claim 16, further storing instructions that, when executed by the at least one processor, cause the mobile computing device to improve a spatial alignment of the rendered image with the live real-time image in response to user interaction with a user interface of the mobile computing device.

19. The non-transitory computer-readable medium of claim 16, further storing instructions that, when executed by the at least one processor, cause the mobile computing device to:
  generate annotation data in response to user interaction with a user interface of the mobile computing device; and
  associate the annotation data with one or more of the virtual element representing the hidden element and the virtual element representing the unhidden element of the facility represented by the modeled facility data in response to user interaction with the user interface of the mobile computing device.

20. The non-transitory computer-readable medium of claim 16, further storing instructions that, when executed by the at least one processor, cause the mobile computing device to:

generate the projection parameters further based on at least optical scaling data, derived from: (i) characteristics of an optical lens of the optical sensor of the mobile computing device, and (ii) a size of the display screen of the mobile computing device, to improve the spatial alignment.

* * * * *

UNITED STATES PATENT AND TRADEMARK OFFICE
CERTIFICATE OF CORRECTION

PATENT NO.         : 10,482,659 B2                                          Page 1 of 1
APPLICATION NO.    : 14/799859
DATED              : November 19, 2019
INVENTOR(S)        : Li et al.

It is certified that error appears in the above-identified patent and that said Letters Patent is hereby corrected as shown below:

In the Claims

In Column 20, Line 4, in Claim 16, delete "the an" and insert -- the --, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*